United States Patent [19]
Matsushita et al.

[11] Patent Number: 5,987,083
[45] Date of Patent: Nov. 16, 1999

[54] SIGNAL TRANSMISSION APPARATUS WITH A PLURALITY OF LSIS

[75] Inventors: Shigeru Matsushita, Gyoda; Kazuo Takano, Saitama, both of Japan

[73] Assignee: Advantest Corporation, Tokyo, Japan

[21] Appl. No.: 08/718,310

[22] PCT Filed: Jan. 31, 1995

[86] PCT No.: PCT/JP95/00122

§ 371 Date: Sep. 30, 1996

§ 102(e) Date: Sep. 30, 1996

[87] PCT Pub. No.: WO96/24208

PCT Pub. Date: Aug. 8, 1996

[51] Int. Cl.[6] .................................................. H04L 7/00
[52] U.S. Cl. ................................................................. 375/356
[58] Field of Search .................................... 375/356, 371, 375/377; 370/516, 517, 519; 371/1

[56] References Cited

U.S. PATENT DOCUMENTS 4,430,745  2/1984  Betts ......................................... 375/377
5,712,883  1/1998  Miller et al. ............................. 375/356

FOREIGN PATENT DOCUMENTS

55-26797   2/1980   Japan .
59-161949  12/1984  Japan .
61-139139  6/1986   Japan .
62-49738   3/1987   Japan .

*Primary Examiner*—Temesghen Ghebretinsae
*Attorney, Agent, or Firm*—Staas & Halsey, LLP

[57] ABSTRACT

A signal transmission apparatus is provided which increases the transmission rate of data received/transmitted between LSIs of the apparatus which are operated by the same reference clock. An internal clock in a first LSI is output on a clock line from a circuit based on the timing by which data is output on a signal line from the LSI. The output, internal clock is received by a circuit in a second LSI and the data on the signal line is taken in a flip-flop by the received clock. By use of a circuit which takes data therein based on arbitrary timing and from which the data can be taken out based on an arbitrary timing, the phase difference between the received, internal clock and an internal clock in the second LSI is eliminated at the output of the flip-flop.

11 Claims, 11 Drawing Sheets

SIGNAL TRANSMISSION APPARATUS WITH A PLURALITY OF LSIS

BACKGROUND OF THE INVENTION

1. Field of the Invention

The present invention relates to a signal transmission apparatus with a plurality of LSIs (Large Scale Semiconductor Integrated Circuit) which is capable of transmitting a data signal at high speed between a first LSI and a second LSI of the signal transmission apparatus in case that the first LSI and the second LSI are operated by a common reference clock signal and that the data signal outputted from the first LSI is received and processed by the second LSI.

2. Description of the Related Art

Figure 1:
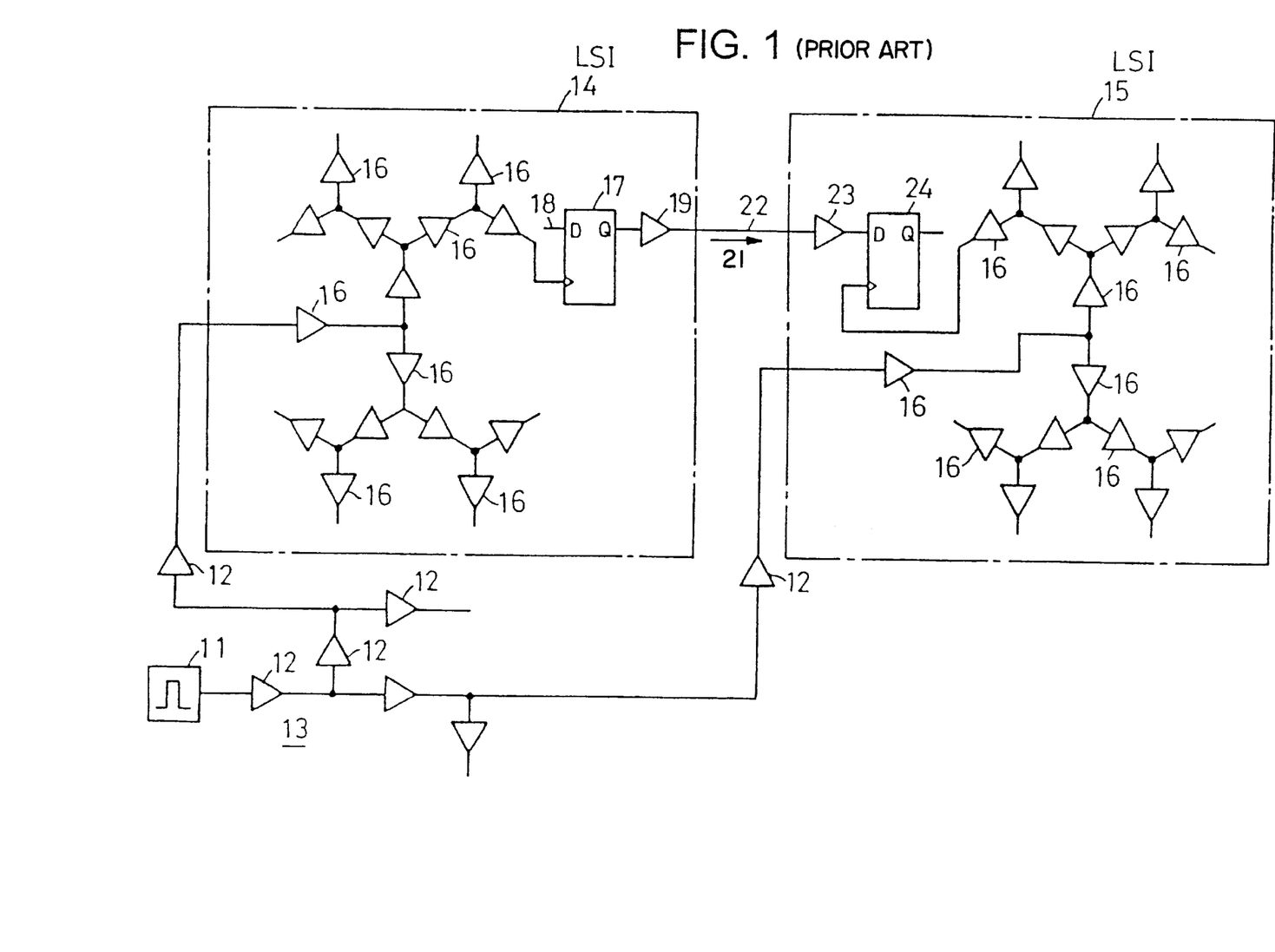
FIG. 1 is a block diagram showing a prior art for sending and receiving data signals between LSIs 14 and 15 mounted on a same wiring substrate or on different wiring substrates.

Various kinds of electronic appliances and/or devices have been highly advanced and have been large scaled, and many LSIs are used in one apparatus and the high speed operation of such apparatus is requested. In addition, for example, as in a semiconductor device testing apparatus, it is sometimes requested to operate many LSIs used in the testing apparatus by the same reference clock signal and to cause the LSIs to process respective data signals at the same timing. In this case, as shown FIG. 1, a reference clock signal from a clock source 11 is supplied to distribution means 13 in which a plurality of buffers 12 are connected in tree structure and is distributed by the distribution means. These distributed reference clock signals are supplied to LSIs 14, 15, . . . through buffers 12 of the same number of stages, respectively. In FIG. 1, only two LSIs are shown, but usually many LSIs are used. In each of the LSIs 14 and 15, the supplied reference clock signal is sent to distribution means in which a plurality of buffers 16 are connected in tree structure. Then, the reference clock signal is distributed to various parts or portions from the central portion of each of the LSIs 14 and 15 via the buffers 16 of the same number with one another to make the internal clock signals of the same phase. The data signals in the LSIs are processed at the same timing using those internal clock signals, respectively.

For example, in the LSI 14, a data signal 18 is taken in a flip-flop 17 by an internal clock signal and the data signal taken in the flip-flop 17 is outputted to the outside through a buffer 19. The data signal 21 is supplied to the LSI 15 via a signal line 22 and is taken in a flip-flop 24 by the internal clock signal through a buffer 23 in the LSI 15.

Figure 2A:
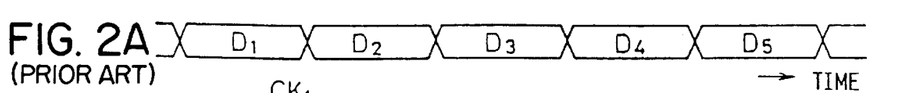
FIGS. 2A–2E are timing charts for explaining the operation of the prior art signal transmission apparatus shown in FIG. 1 and its problem.
Figure 2B:
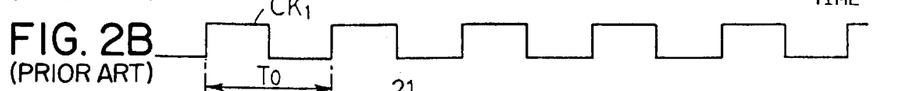
Figures 2C, 2D:
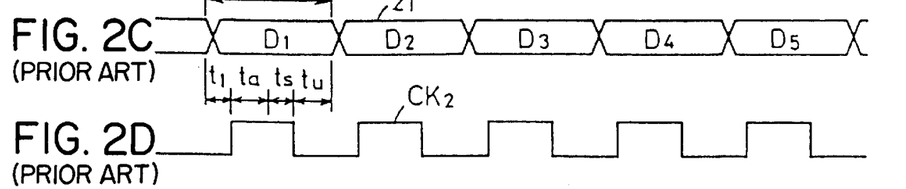
Figure 2E:
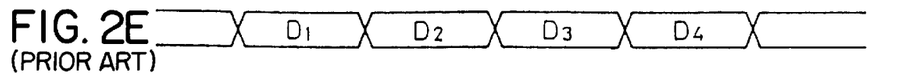

The reference clock signal from the clock source 11 must be distributed to many paths. Also, a relatively large phase difference is generated between the reference clock signals inputted to the LSIs 14 and 15 because of the relationship of the arrangement of many LSIs. As a result, it is difficult to transmit data signals at high speed. That is to say, for example, as shown in FIG. 2, assuming that the input data signal 18 (FIG. 2A) of the flip-flop 17 in the LSI 14 is taken in the flip-flop 17 by the internal clock signal $CK_1$ (FIG. 2B) of the LSI 14 and the output data signal 21 from the LSI 14 becomes as shown in FIG. 2C, and that the internal clock signal $CK_2$ of the LSI 15 is delayed by time $t_1$ relative to the internal clock signal $CK_1$ as shown in FIG. 2D due to the relative delay of the distributed reference clock signal, the data signal taken in the flip-flop 24 becomes as shown in FIG. 2E. If the time required to set up a data signal in the flip-flop 24 to the internal clock signal is $t_s$ and the dispersion of the internal clock signal $CK_2$ based on the dispersion of LSI pattern to the internal clock $CK_1$ is $t_u$, since the data signal cannot correctly be taken in the flip-flop 24 for the input data change during the set-up time $t_s$, the data signal cannot correctly be taken in the flip-flop 24 when the value $t_a$ which is the value that the delay time $t_1$, the set-up time $t_s$ and the dispersion time $t_u$ are subtracted from the period $T_0$ of the reference clock signal is not positive. The set-up time $t_s$ and the dispersion time $t_u$ are the fixed values. If $t_1$ is large and the period $T_0$ is small due to the high speed data signals, $t_a=(T_0-t_1-t_s-t_u)$ becomes zero or a negative value and thus the data signals cannot be transmitted. Particularly, the phase difference $t_1$ between the reference clock signals distributed to the LSIs mounted on the different wiring substrates is considerably large and thus, the transmission of the high speed data signals is difficult.

Figure 4:
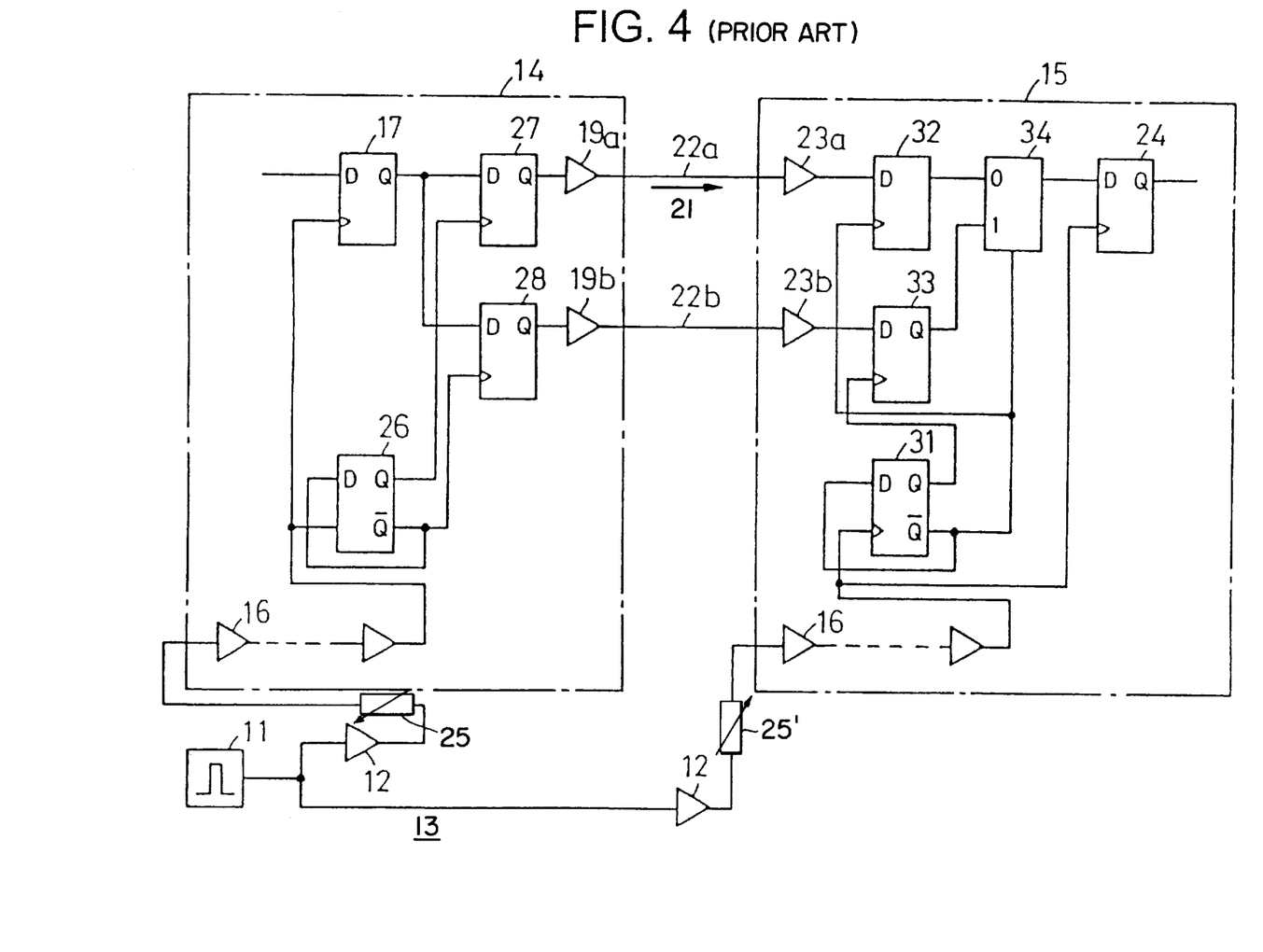
FIG. 4 is a block diagram showing a prior art interleave method for solving the problem shown in FIG. 3.

In order to solve this problem, in the prior art, as shown in FIG. 4 where the same reference characters are assigned to the portions corresponding to those of FIG. 1, delay lines 25 and 25' are inserted into the reference clock distribution means 13 for LSIs 14 and 15, respectively, to adjust each delay amount of the delay lines 25 and 25' so that the phases of the clock signals reaching the respective LSIs 14 and 15 are the same.

However, there is a shortcoming that the provision of such delay lines 25 and 25' makes the space of the printed circuit substrate (board) large and the adjustment of the delay of the delay lines 25 and 25' requires long time.

Figure 3A:
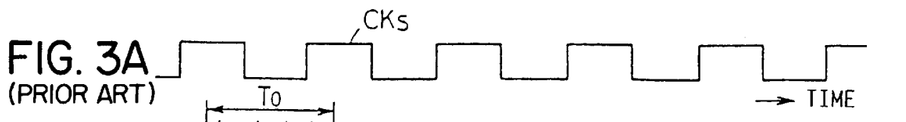
FIGS. 3A and 3B are timing charts for explaining the problem in sending and receiving data signals between LSIs 14 and 15 mounted on a same wiring substrate.
Figure 3B:
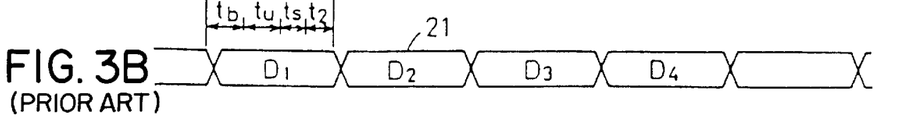

In addition, an LSI operating at a frequency of several hundred MHz has appeared and the reference clock signal whose period is several nano seconds has been requested. In such a high speed transmission, if the LSIs 14 and 15 are mounted on the same printed circuit substrate, the signal line 22 connecting between the LSIs 14 and 15 has a reduced allowance in its wiring pattern length. For example, if the data signal taken in the LSI 14 is outputted from the LSI 14 with the delay time $t_2$ as shown in FIG. 3B against the reference clock signal $CK_S$ (FIG. 3A) distributed to LSIs 14 and 15, the difference $t_b$ between the clock period $T_0$ and the sum of the delay time $t_2$, the set-up time $t_s$ and the dispersion time $t_u$ is the delay time permitted for the signal line 22 between the LSIs 14 and 15. Namely, the delay time of the signal line 22 is required not to be longer than the time $t_b$. If $t_b$ is 4 nano seconds, the signal line (wiring pattern length) 22 cannot be longer than approximately 10 cm.

Figures 5A, 5B:
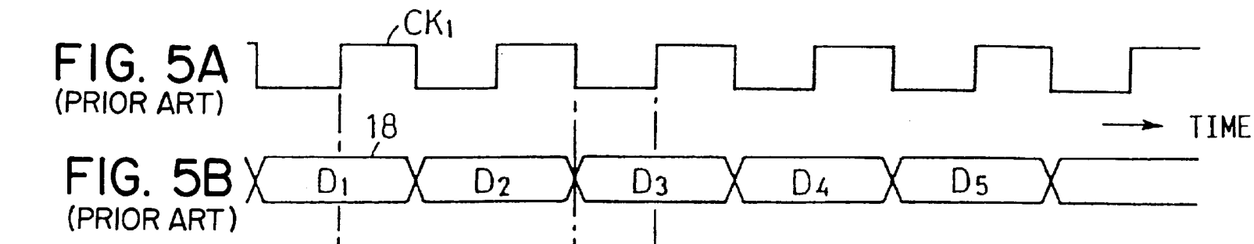
FIGS. 5A–5G are timing charts for explaining the operation of the prior art signal transmission apparatus shown in FIG. 4.
Figure 5C:
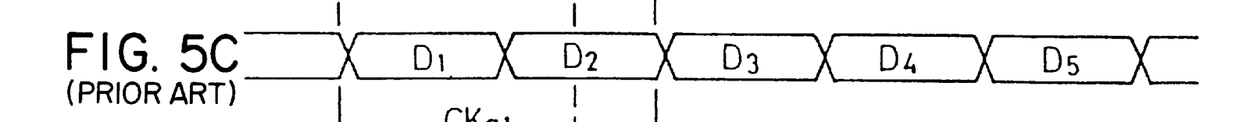
Figure 5D:
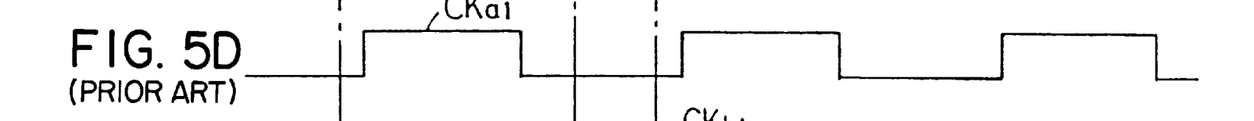
Figure 5E:
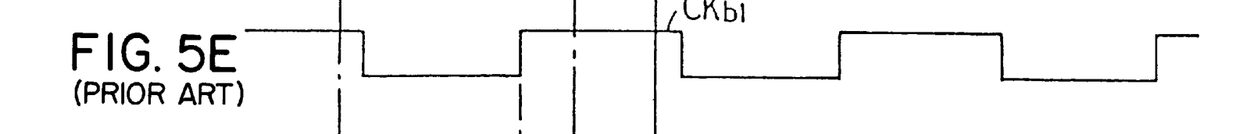
Figures 5F, 5G:
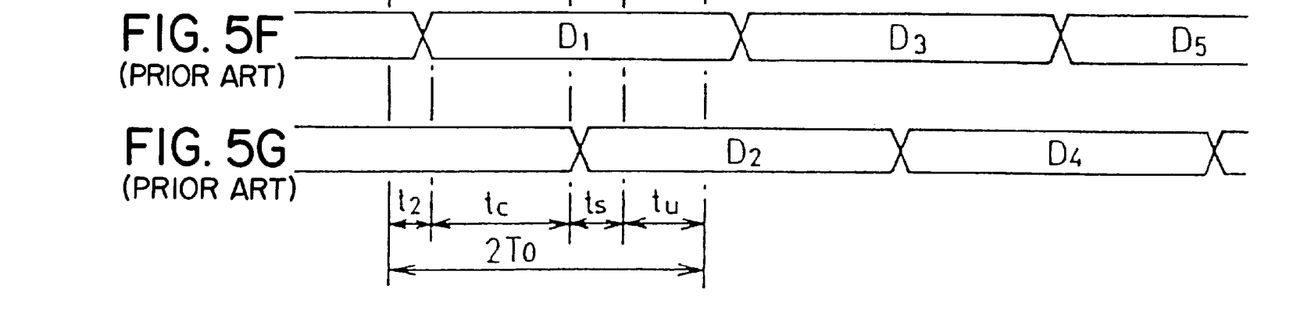

In order to improve this problem, a circuit called an interleave system has been used. That is, as shown in FIG. 4, the internal clock signal $CK_1$ of the LSI 14 is frequency divided into one second (½) frequency by a frequency divider circuit of a flip-flop 26. As the Q output and the $\overline{Q}$ output of the flip-flop 26, two series of low speed clock signals $CKa_1$ and $CKb_1$ each period of which is mutually shifted by the period of the internal clock signal $CK_1$ and is two time length of the internal clock $CK_1$ are obtained. The output data (FIG. 5C) of the flip-flop 17 are taken by the rising edges of these low speed clock signals $CKa_1$ and $CKb_1$ in the flip-flops 27 and 28, respectively, as shown in FIGS. 5F and 5G. That is, each of the data $D_1, D_3, D_5, \ldots$ is outputted from the flip-flop 27 in double length and each of the data $D_2, D_4, D_6, \ldots$ is outputted from the flip-flop 28 in double length. These data of reduced speed from the flip-flops 27 and 28 are outputted from the LSI 14 and supplied to the LSI 15 via the signal lines (wiring patterns) 22a and 22b. In the LSI 15, the internal clock signal $CK_2$ is frequency divided into one second frequency by a frequency divider circuit of a flip-flop 31 to obtain the same signals as shown in FIGS. 5D and 5E as the Q output and the $\overline{Q}$ output respectively. The data from the signal lines 22a and 22b are taken in the flip-flops 32 and 33 by the rising edges of the respective low speed clock signals. The output data of the flip-flops 32 and 33 are controlled by the $\overline{Q}$ output of the flip-flop 31 in a multiplexer 34 and alternately taken out in the period of the internal clock $CK_2$. Then the data are supplied to flip-flop 24.

In this case, as is apparent from FIG. 5, the delay time in the signal lines 22a and 22b is permitted up to the difference between $2T_0$ and the sum of the data signal delay time $t_2$ in the LSI 14, the set-up time $t_s$ and the dispersion time $t_u$. That is, approximately time $T_0$ more allowance could be provided than the case of FIG. 1. In the above case, the data signals are converted into two series of low speed data signals by making the period double and are transmitted. However, in general, high speed data signals are transmitted by converting the data into N (N is an integer equal to or greater than 2, particularly, $2^1$, $2^2$, $2^3$, etc.) series of low speed data signals having N time period and by similarly transmitting them.

However, when an LSI is organized utilizing so called ASIC (Application Specific IC) which comprises arrays of basic units (basic cells) such as gates and is constructed as a special purpose circuit based on a user request, the circuit of FIG. 4 requires four times of the number of flip-flops compared with the circuit of FIG. 1. In the above example, the data transmission in bit basis is shown. However, 16 bit data or 32 bit data are usually transmitted and in this case, the signal transmission systems shown in FIG. 1 or FIG. 2 must be provided in parallel for the number of bits. The interleave system shown in FIG. 4 requires significantly more basic cells in the ASIC. Thus, there is a problem that the number of basic cells for other functions in the ASIC is limited.

Therefore, a first object of the present invention is to provide a signal transmission apparatus with a plurality of LSIs which is capable of a high speed data signal transmission between a plurality of LSIs mounted on a printed wiring substrate or on different printed wiring substrates, which mutually sends and receives data signals and operates with a reference clock signal without requiring a phase adjustment requiring long time and without requiring a large scale hardware, i.e. a large space on the wiring substrate.

A second object of the present invention is to provide a signal transmission apparatus with a plurality of LSIs which is capable of a high speed data signal transmission between a plurality of LSIs mounted on a printed wiring substrate, which operates by a reference clock signal and mutually sends and receives data signals with the reduced number of basic cells and with an increased allowance for the signal line length (wiring length) between the LSIs.

A third object of the present invention is to provide a signal transmission apparatus with a plurality of LSIs which satisfies the first object and the second object at the same time.

SUMMARY OF THE INVENTION

In a first invention for achieving the first object, a signal transmission apparatus in which a reference clock signal is supplied to a first LSI and a second LSI, which operates with an internal clock signal created from the reference clock signal, and in which the data signals from the first LSI are received by the second LSI is provided. In this signal transmission apparatus, a clock output circuit is provided in the first LSI, an internal clock signal is externally outputted at the timing when data signals are externally (to the second LSI) outputted, a clock receiving circuit for receiving the outputted internal clock signal is provided in the second LSI, the data signals outputted from the first LSI are taken in phase difference absorbing means provided in the second LSI by the internal clock signal received by the clock receiving circuit, and in the phase difference absorbing means, the received data taken in the phase difference absorbing means is taken out by the internal clock signal of the second LSI.

The phase difference absorbing means takes therein the received data from the data receiving circuit by the clock signal from the clock receiving circuit. The received data are converted into N (N is an integer equal to or greater than 2) series of data signals each of which is sequentially shifted by the period of the clock signal and has N time length. Regarding these N series of data signals, the data signals corresponding to the N series of data signals are taken out and assembled in every N time period of the internal clock signal period of the second LSI sequentially shifted by the period of the clock signal period. That is, the phase difference absorbing means takes therein the data signals at an arbitrary timing, temporarily stores them and takes out the data signals at an arbitrary timing.

The phase difference absorbing means specifically comprises means for taking therein the received data from the data receiving circuit by the clock signal from the clock receiving circuit, means for converting the data signals into N (N is an integer equal to or greater than 2) series of data signals each of which is sequentially shifted by the period of the clock signal and has N time length of the clock period, and means for taking out and for assembling the data signals corresponding to these N series of data signals in every N time period of the internal clock signal period of the second LSI sequentially shifted by the clock signal period.

The means for taking therein the data signals comprises means for converting the clock signal from the clock receiving circuit into N series of low speed clock signals each of which is sequentially shifted by the clock signal period and has N time length, and N means for taking therein the outputs of the data receiving circuit by the N series of the low speed clock signals respectively. The means for taking out comprises means for frequency dividing the internal clock signals of the second LSI into one Nth frequency and selector means for sequentially taking out the output data signals from the N means at the timing sequentially shifted by the period of the internal clock signal using the plurality of the frequency divided outputs in the frequency dividing means as the selection signals.

The other means of a specific example of the phase difference absorbing means comprises means for writing in a memory the received data signals from the data receiving circuit in synchronization with the clock signal from the clock receiving circuit and for taking out the storage contents of the memory in synchronization with the internal clock signal of the second LSI. In this case, a FIFO (First In First Out) memory may also be used.

In the second invention for achieving the second object, a multiple LSI signal transmission apparatus where a reference clock signal is supplied to the first and the second LSIs, the first and the second LSIs synchronously operate using this reference signal as the reference, the data signal is outputted to the outside from the output circuit in the first LSI, and the outputted data signal is received by the data receiving circuit in the second LSI is provided. In this multiple LSI signal transmission apparatus, M series of low speed clock signals each of which is sequentially shifted by the reference clock signal period and has M time length of the reference clock signal period are created from the reference clock signal in the data output circuit, the data signals synchronized with the reference clock signal are latched in M latch circuits by the M series of the low speed clock signals respectively, and the outputs of these M latch circuits are used as the output data of the first LSI. In the data receiving circuit, M series of low speed clock signals each of which is sequentially shifted by the period of the reference clock signal and has M time length of the reference clock signal period are created from the reference clock signal. Then, the M series of data signals outputted from the first LSI are latched in the M latch circuits by these M series of low speed clock signals respectively. The outputs of these M latch circuits are controlled by the signals from the means for obtaining the low speed clock signals in a multiplexer and sequentially taken out in the period of the reference signal.

The third invention for achieving the third object is the combination of the first invention and the second invention.

DESCRIPTION OF THE PREFERRED EMBODIMENTS

Figure 6:
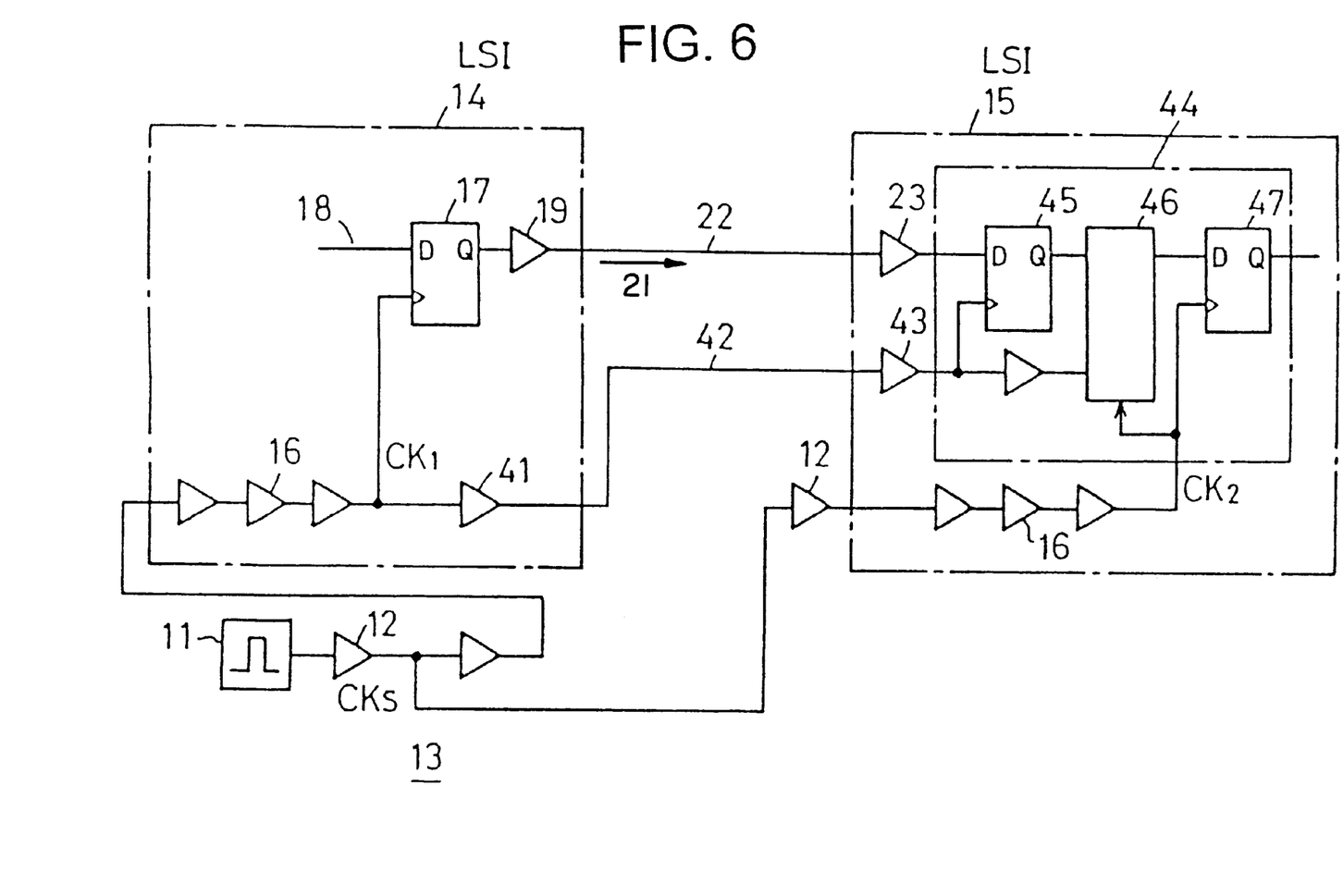
FIG. 6 is a block diagram briefly showing an embodiment of the first invention.

FIG. 6 briefly shows an embodiment of the first invention and the same reference symbols are assigned to the portions corresponding to those in FIG. 1. LSIs 14 and 15 are mounted on a same wiring substrate or on different substrates respectively although this is not indicated in the figure. When these LSIs are mounted on the different substrates respectively, the signal line 22 by which the output data signal 21 of the LSI 14 is transmitted is usually a balanced transmission line so that the data signal is hard to be influenced by an external noise. In the figure, only the portions related to this invention are shown. The portions for distributing the reference clock signal $CK_S$ to create the internal clock signals $CK_1$ and $CK_2$ in the LSIs 14 and 15 and the data signal process function of each portion are omitted in the figure.

In this invention, a clock output circuit 41 for externally outputting the internal clock signal $CK_1$ at the timing of externally outputting the data signal from the LSI 14 is provided. The clock output circuit 41 may be a circuit similar to a buffer 19. The internal clock signal $CK_1$ for taking a data signal 18 in the flip-flop 17 is split and supplied to the clock output circuit 41. This externally outputted internal clock signal $CK_1$ is supplied to the LSI 15 via a clock line 42. The clock line 42 is approximately same length as the signal line 22, i.e. the same delay time, and is a balanced line if the LSIs 14 and 15 are mounted on different wiring substrates, respectively.

In the LSI 15, a clock receiving circuit 43 is provided to receive the internal clock $CK_1$ from the clock line 42. The clock receiving circuit may be a buffer similar to the buffer 23. The data signal from the signal line 22, i.e., the output of the buffer 23 is taken in the phase difference absorbing means 44. The taken data signal in the phase difference absorbing means is taken out by the internal clock signal $CK_2$ of the LSI 15. For example, the data signal from the buffer (data receiving circuit) 23 is taken in the flip-flop 45 by the received clock signal from the clock receiving circuit 43. Regarding the output data of the flip-flop 45, the phase difference between the clock signal of the clock receiving circuit 43 and the internal clock signal $CK_2$ of the LSI is eliminated in the phase difference absorbing circuit 46. The data signal from which the phase difference is eliminated is taken in the flip-flop 47 by the internal clock signal $CK_2$ to become the operation (process) data signal in the LSI 15.

In such a way, by outputting the internal clock signal $CK_1$ of the LSI 14 and by taking the data signal 21 from the LSI 14 in the LSI 15 by that clock signal, the phase difference between the input data signal 21 of the LSI 15 and the internal clock signal $CK_2$ can be made almost equal to the phase difference between the distributed reference clock signals $CK_S$. That is, in the prior art signal transmission apparatus shown in FIG. 1, the signal transmission is influenced not only by the phase difference between the distributed reference clock signals $CK_S$ but also by the dispersion of the signal transmission time between the LSIs 14 and 15. However, the dispersion of signal transmission time in the same LSI is significantly smaller than the dispersion of signal transmission time between the different LSIs. Therefore, the phase difference between the data signal 21 outputted from the buffer 19 and the internal clock signal $CK_1$ outputted from the clock output circuit 41 can be ignored. Since the data signal 21 is taken in the LSI 15 by the received internal clock $CK_1$, the problem caused by the dispersion of the transmission time between LSIs is eliminated. The phase difference between the distributed reference clock signals is eliminated by the phase difference absorbing means 44 and thus the transmission of high speed data signals can be possible.

Figure 7:
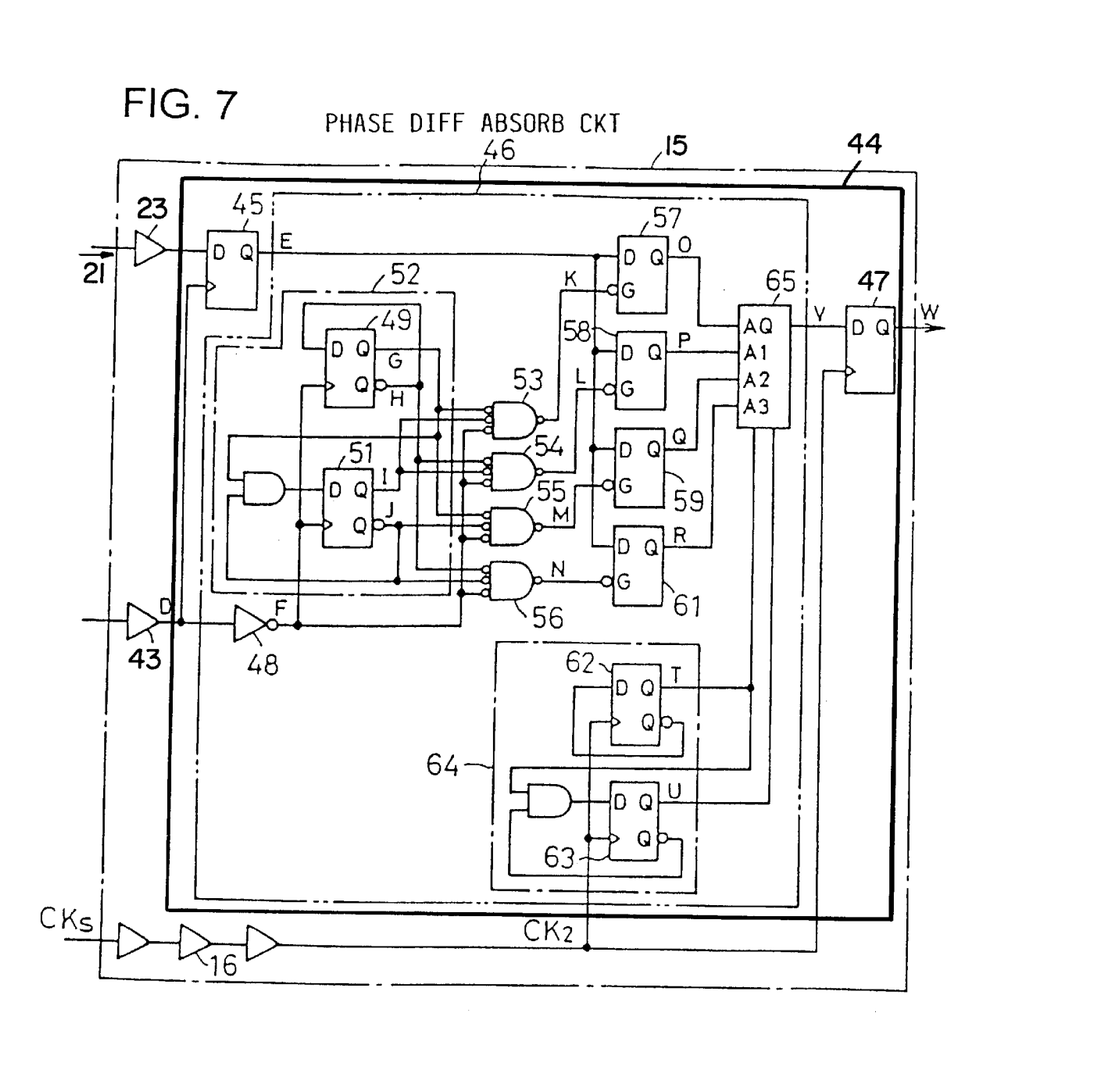
FIG. 7 is a logic circuit diagram showing a specific example of the phase difference absorbing means in FIG. 6.

FIG. 7 shows a specific example of the phase difference absorbing means 44 and FIG. 8 shows the operation timing chart. FIG. 8 also shows the operation of a part of FIG. 6 and hence the explanation will be started from that part. The data signals 18 (FIG. 8B) are taken in the flip-flop (data output circuit) 17 by the rising edges of the internal clock signal $CK_1$ (FIG. 8A) and are outputted from the LSI 14 as the data signals 21 (FIG. 8C). The internal clock signal $CK_1$ is also outputted from the LSI 14 at the same timing with the data signals 21. FIG. 8D shows a phase inverted signal of the outputted internal clock $CK_1$. In the LSI 15, the received data signals 21 (FIG. 8C, the delay of the signal line 22 is omitted) are taken in the flip-flop 45 by the rising edges of the inverted signal of the clock signal from the clock receiving circuit 43 (FIG. 8D, the time delay of the clock line 42 is omitted) and the data shown in FIG. 8E is outputted from the flip-flop 45. The phase inversion of the received clock signal is performed by the clock receiving circuit 43 or the clock output circuit 41.

Figure 8A:
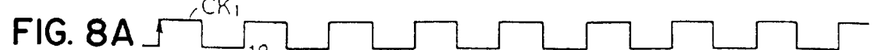
FIGS. 8A–8W are timing charts for explaining the operation of FIG. 7.
Figure 8B:
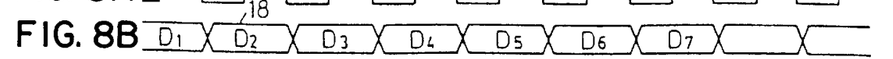
Figure 8C:
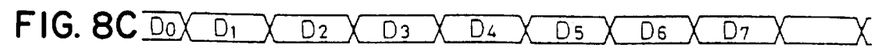
Figure 8D:
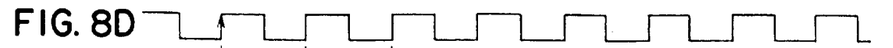
Figure 8E:
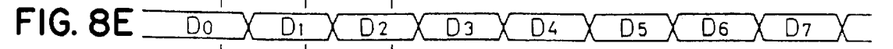
Figure 8F:
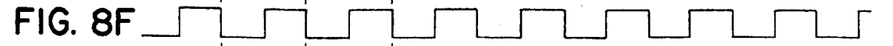
Figure 8G:
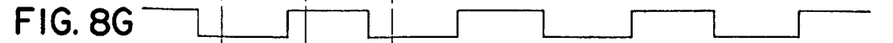
Figure 8H:
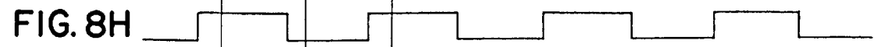
Figure 8I:
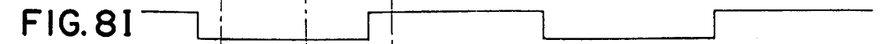
Figure 8J:
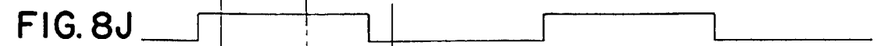
Figure 8K:
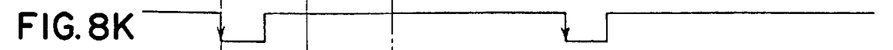
Figure 8L:
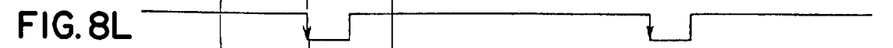
Figure 8M:
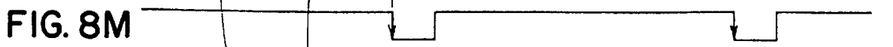
Figure 8N:
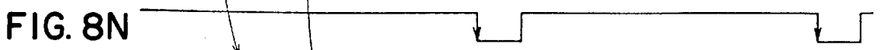
Figure 8O:
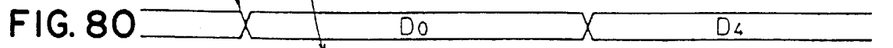
Figure 8P:
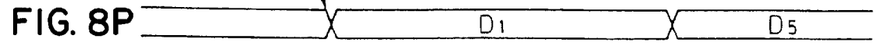
Figure 8Q:
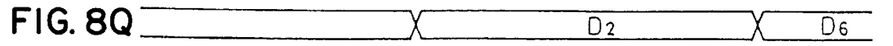
Figure 8R:
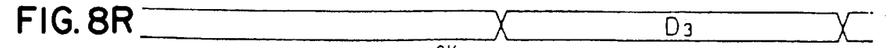

As shown in FIG. 7, the output of the clock receiving circuit 43 is branched and is phase inverted by an inverter 48 to become the clock signal shown in FIG. 8F. Then the clock signal is frequency divided into one fourth frequency by a frequency dividing circuit 52 consisting of two stage flip-flops 49 and 51. As the Q output and the $\overline{Q}$ output of the first stage flip-flop 49, the clock signals of mutually opposite phase and of one second frequency are obtained as shown in FIGS. 8G and 8H, respectively. As the Q output and the $\overline{Q}$ output of the last stage flip-flop 51, the clock signals of mutually opposite phase and of one fourth frequency are obtained as shown in FIGS. 8I and 8J, respectively. The logical products between the combinations of one of the two clock signals of one second frequency and one of the two clock signals of one fourth frequency and the output of the inverter 48 are taken by the AND circuits 53, 54, 55 and 56, respectively. Then, as shown in FIGS. 8K, 8L, 8M and 8N, four series of low speed clock signals each of which is sequentially shifted by the period $T_0$ of the received clock signal (FIG. 8D) and has four time period $4T_0$ are obtained.

The output data signals (FIG. 8E) are taken in the flip-flops 57, 58, 59 and 61 by the falling edges of these four series of low speed clock signals, respectively. As shown in FIGS. 8O, 8P, 8Q and 8R, the output data of the flip-flop 45 are separated and converted into four series of data signals each of which is sequentially shifted by the clock period $T_0$ and has four time length, and those converted signals are obtained from the flip-flops 57, 58, 59 and 61, respectively.

Figure 8S:
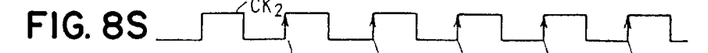
Figure 8T:
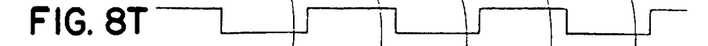
Figure 8U:
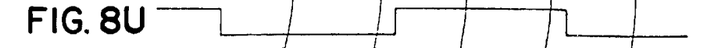
Figure 8V:
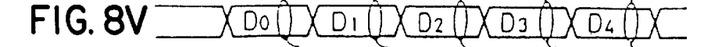
Figure 8W:
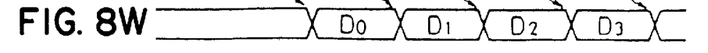

On the other hand, the internal clock signal $CK_2$ (FIG. 8S) is frequency divided into one fourth frequency by the frequency dividing circuit 64 consisting of two stage flip-flops 62 and 63. The Q output (FIG. 8T) of the first stage flip-flop 62 and the Q output (FIG. 8U) of the last stage flip-flop 63 are given to a selector 65 as selection signals. Each output of the flip-flops 57, 58, 59 and 61 is sequentially taken out in each period $T_0$ and assembled to make the data signals shown in FIG. 8V. These data signals are taken in the flip-flop 47 by the falling edges of the internal clock signal $CK_1$ to create the data signals shown in FIG. 8W, and are then used or processed in the LSI 15. In such a way, even if there is a considerable phase difference between the data signals 21 (FIG. 8C) inputted to the LSI 15 and the reference clock signal $CK_S$, i.e., the internal clock signal $CK_2$, since the input data signals are separated into a plurality of series data and each data is taken in at the timing of the internal clock $CK_2$ in the extended data state, the data signals can correctly be taken in. That is, the phase difference between the input data and the internal clock signal $CK_2$ is absorbed.

The absorption of the phase difference by separating the input data signals into a plurality of series data and by extending the data is not limited to the case where the data are converted into four series of data each of which has four time length. In general, the data can be converted into N (N is an integer equal to or greater than 2) series of data each of which has N time length. N is usually $2^1, 2^2, 2^3, \ldots$ etc.

Figure 9A:
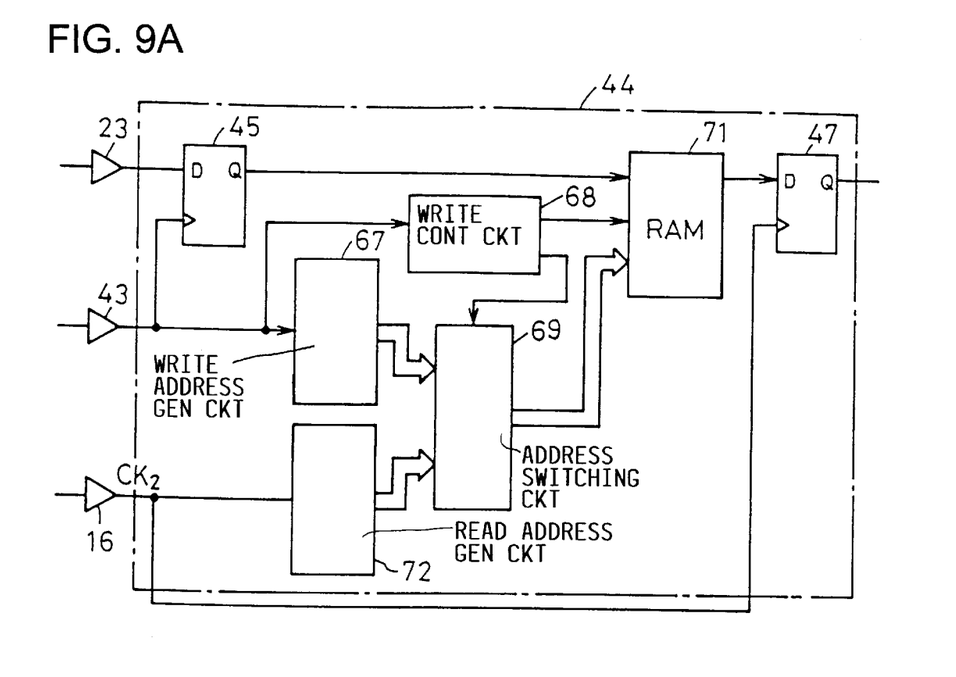
FIGS. 9A and 9B are block diagrams showing the other specific examples respectively of the phase difference absorbing means in FIG. 6.

FIG. 9A shows another example of the phase difference absorbing means 44. The received clock signal from the clock receiving circuit 43 is also supplied to a write address generation circuit 67 and a write control circuit 68. At this time, a write address and a write signal are generated. The write address is supplied to a RAM 71 via an address switching circuit 69 controlled by the write control circuit 68. The output data of the flip-flop 45 is written in the RAM 71 based on the address indication of the write address and the control of the write signal. That is, the received data in the LSI 15 is written in the RAM 71 at the timing of the received clock signal. On the other hand, the internal clock signal $CK_2$ of the LSI 15 is supplied to a read address generation circuit 72 to create a read address. This read address is supplied to the RAM 71 via the address switching circuit 69. The RAM 71 specified by the address is read out. This read data is taken in the flip-flop 47 by the internal clock $CK_2$. The read address generation circuit 72 is constructed so that the data signals written in the RAM 71 are read in the written sequence after a time delay greater than the presumed maximum value of the phase difference between the distributed reference clocks $CK_S$ supplied to the LSIs 14 and 15, respectively.

Figure 9B:
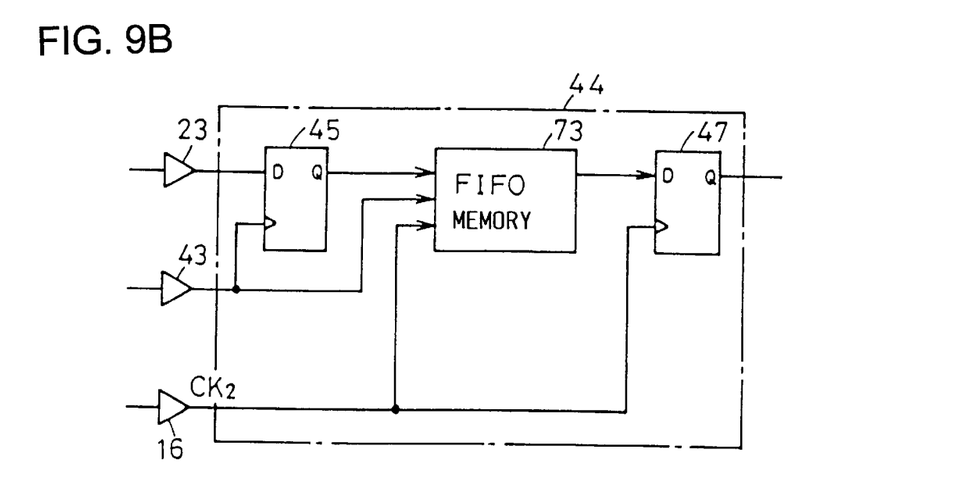

As shown in FIG. 9B, a FIFO memory can also be used instead of the RAM 71. In this case, the output data signal of the flip-flop 45 is slightly delayed from the clock signal of the clock receiving circuit 43. Namely, the data signal is taken in the flip-flop 45 and after the output data becomes stable enough, the output data is taken in the FIFO memory 73. This FIFO memory 73 is read out by the internal clock signal $CK_2$ of the LSI 15. In the FIFO memory, the reading out is performed sequentially from the oldest data of the written data signals. In this case, the read timing is also delayed from the write timing more than the presumed maximum value of the phase difference between the respective reference clock signals of the LSIs 14 and 15.

Figure 10:
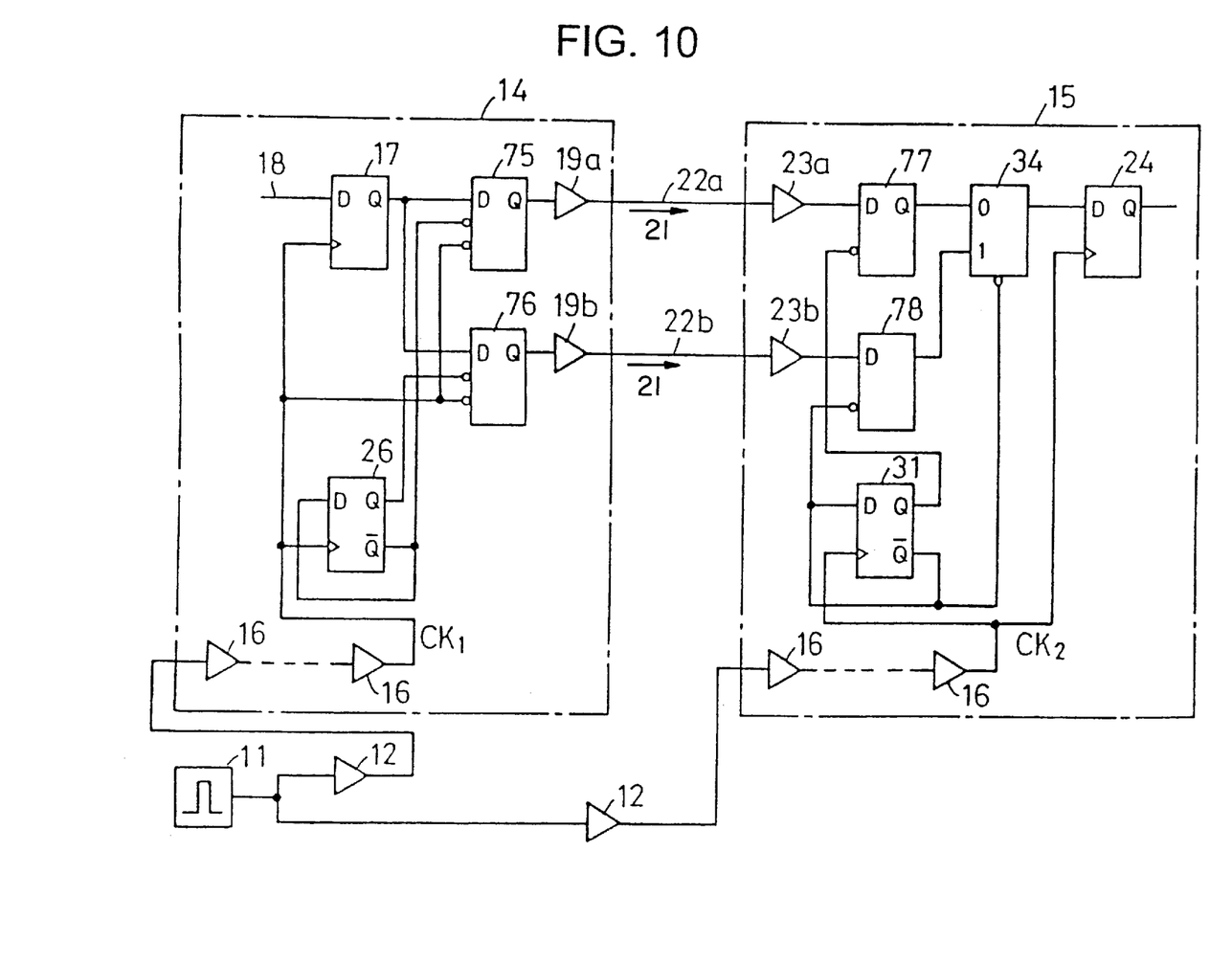
FIG. 10 is a logic circuit diagram showing an embodiment of the second invention.

Next, the embodiment of the second invention will be explained referring to FIGS. 10 and 11. In FIG. 10, the same reference symbols are assigned to the portions corresponding to those in FIG. 4. Compared with FIG. 4, in this embodiment, latch circuits 75, 76, 77 and 78 are used instead of the flip-flops 27, 28, 32 and 33, respectively. In the aforementioned flip-flops, an input data signal is taken in each flip-flop by the rising (or falling) edge of the clock signal and the data signal is held. However, an input data signal is taken in each latch circuit and the data signal is held during the time when the clock signal is high (or low) level. The inverted $\overline{Q}$ output of the flip-flop 26 and the inverted internal clock signal $CK_1$ are supplied to the take-in terminals of the latch circuit 75, respectively. The inverted Q output of the flip-flop 26 and the inverted internal clock signal $CK_1$ are supplied to the take-in terminals of the latch circuit 76, respectively. The inverted Q output and the inverted $\overline{Q}$ output of the flip-flop 31 are supplied to the take-in terminal of the latch circuit 77 and the take-in terminal of the latch circuit 78, respectively.

Figure 11A:
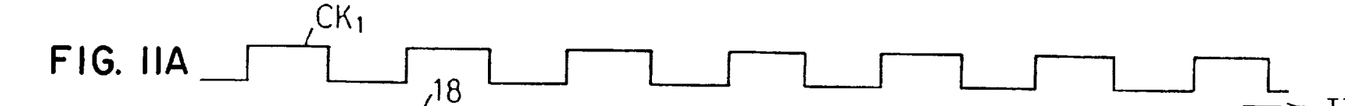
FIGS. 11A–11J are timing charts for explaining the operation of FIG. 10.
Figure 11B:
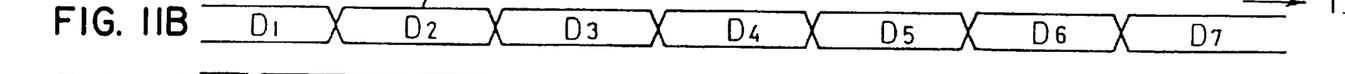
Figure 11C:
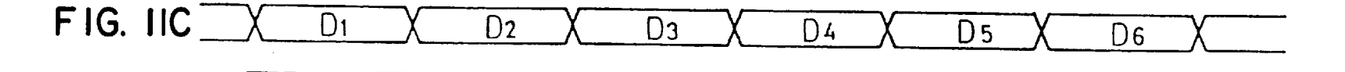
Figure 11D:
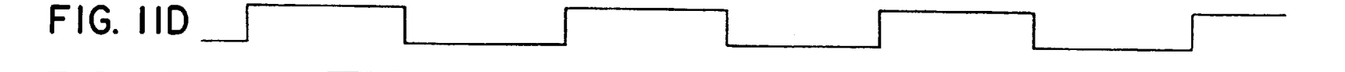
Figure 11E:
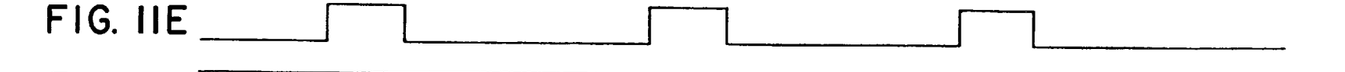
Figure 11F:
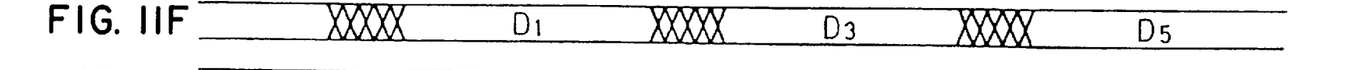
Figure 11G:
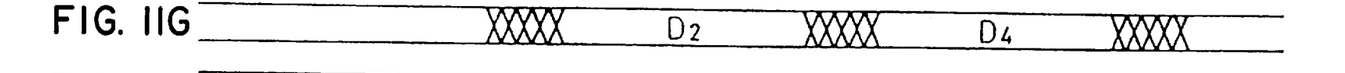
Figure 11H:
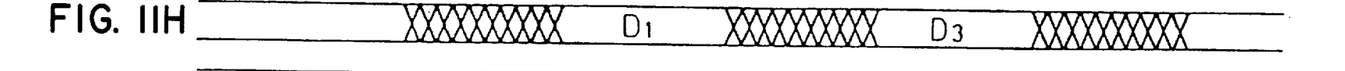
Figure 11I:
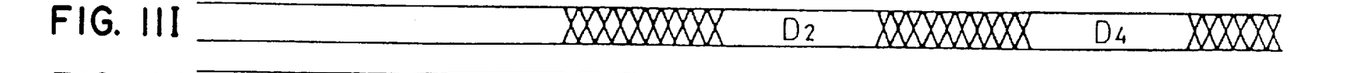
Figure 11J:
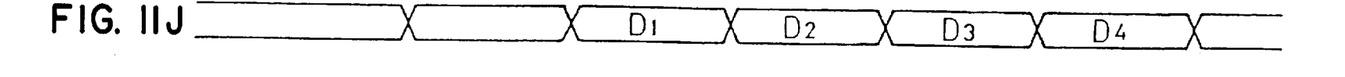

The data signals 18 (FIG. 11B) are taken in the LSI 14 by the rising edges of the internal clock signal $CK_1$ (FIG. 11A) to supply the data signals shown in FIG. 11C to each data terminal of the latch circuits 75 and 76. The Q output of the flip-flop 26 is the clock signal as shown in FIG. 11D and the opposite phase signal can be obtained from the $\overline{Q}$ output of the flip-flop 26 although this is not shown in the figure. In the latch circuit 75, when its two take-in terminals are low level at the same time, a data is taken in therein and otherwise, the last data signal taken therein is held. Therefore, when the wave shape shown in FIG. 11E is high level, both of the two take-in terminals of the latch circuit 75 are low level. When the wave shape shown in FIG. 11E is low level, the latch circuit is in the holding state. As shown in FIG. 11F, the output of the latch circuit 75 taken therein is one of every two consecutive data D1, D3, ... of the output data signals of the flip-flop 17. Each of the firmed data (the portions not marked by slant lines in FIG. 11) has 1.5 times of the period $T_0$ and each of the non-firmed data has 0.5 times of the period $T_0$. Similarly, as shown in FIG. 11G, the output of the latch circuit 76 taken therein is one of the other every two consecutive data $D_2$, $D_4$, ... of the output data signals of the flip-flop 17 and each data length is multiplied by 1.5. If the internal clock signals $CK_1$ and $CK_2$ are the same phase, the signal of the wave shape shown in FIG. 11D is given to the take-in terminal of the latch circuit 77 and the input data signal from the LSI 14 is taken in the latch circuit 77 during the time when signal in FIG. 11D is low level. The data signal is held (firmed up) during the next high level of the signal in FIG. 11D. Thus, the output data as shown in FIG. 11H can be obtained. Similarly, the data signals as shown in FIG. 11I can be obtained from the latch circuit 78. Therefore, as shown in FIG. 11J, the data signals having period $T_0$ can be obtained from the multiplexer 34. Therefore, the time length of the input data signal is 1.5 times of that in FIG. 1 case, and thus, the delay allowance of the signal lines 22a and 22b can be increased by the extended length. In this case, the data signals are separated into two series and each data length is extended to 1.5 time length. Similarly, in general, the data signals can be separated into N (N is an integer equal to or greater than 2, usually $2^1$, $2^2$, $2^3$, ... ) series and each data length can be extended to (N−0.5) time length. After receiving each series of data, series by series, in the LSI 15, a series of data can be composed by sequentially taking out each data series in the every period.

Figure 12:
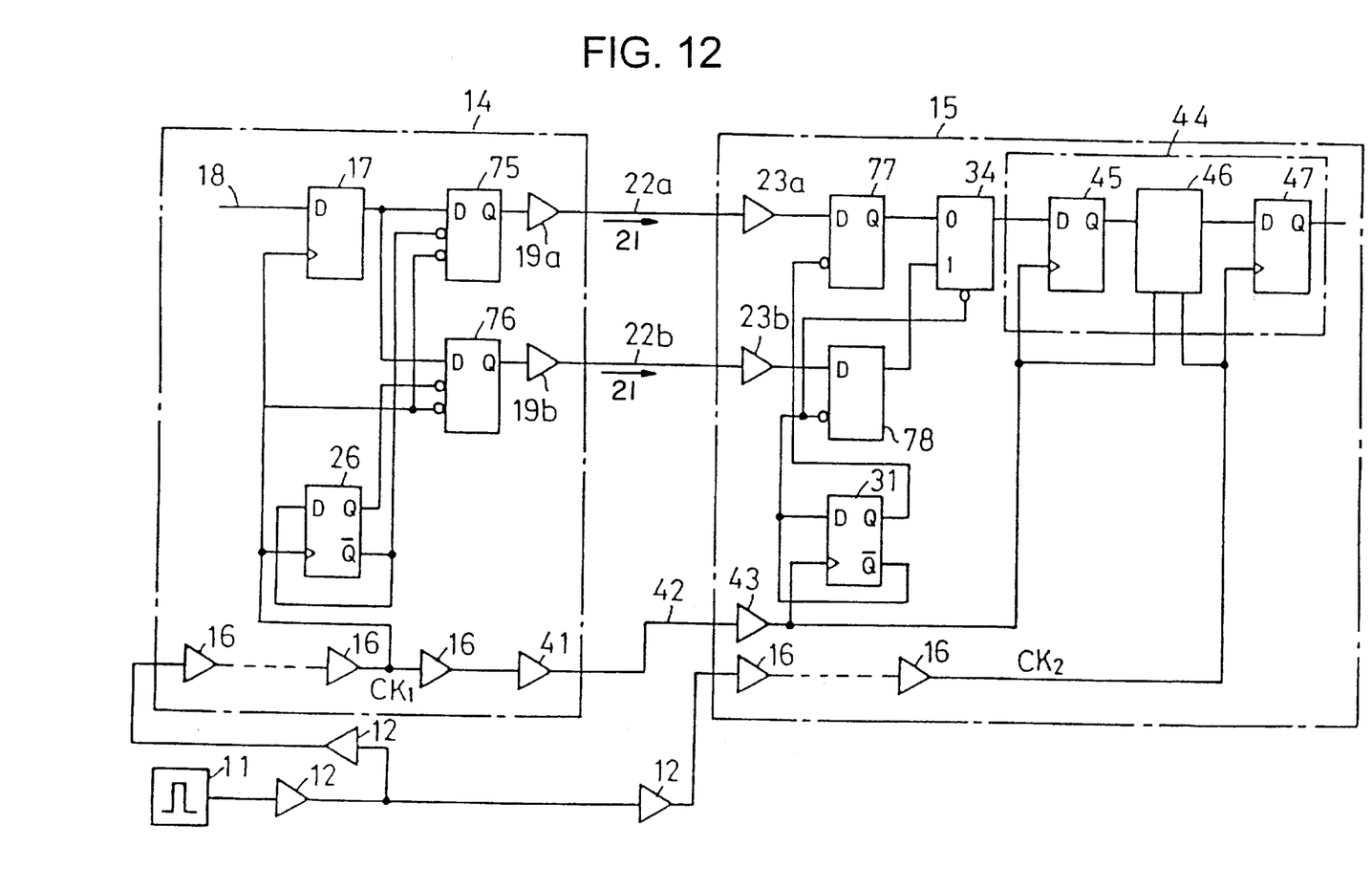
FIG. 12 is a block diagram showing an embodiment of the third invention.

FIG. 12 shows an embodiment of the third invention. In FIG. 12, the same reference characters are assigned to the portions corresponding to those in FIG. 6 and 10. In this example, the data signals 18 are separated into two series of data and each data is extended to 1.5 time length, and are then outputted over the signal lines 22a and 22b respectively from the LSI 114. At the same time, the internal clock signal $CK_1$ is outputted over the clock line 42. In the LSI 15, the clock signal from the clock line 42 is received by the clock receiving circuit 43. The received clock signal is frequency divided by the flip-flop 31 into one second frequency. The data signals from the signal lines 22a and 22b are taken in the latch circuits 77 and 78 by the Q output and the $\overline{Q}$ output of the flip-flop 31, respectively. The output data from these latch circuits 77 and 78 are composed to a series of data signals by the multiplexer 34. The composed data signals are taken in the flip-flop 45 of the phase difference absorbing means 44. The data signals are taken out by the internal clock signal $CK_2$ to eliminate the phase difference.

Also in this case, in the LSI 14, the data signals 18 can be separated into N series of data signals and each data is extended to (N−0.5) time length, and are then outputted from the LSI 14. These data signals are composed into a series of data signals in the LSI 15. Thus, the apparatus can be arranged to eliminate the phase difference on the composed data signals.

Each of the first invention, the second invention and the third invention is applied to the sending and receiving of the data signals between two LSIs. However, it is apparent that these inventions can be applied to the sending and receiving of the data signals between many LSIs.

As mentioned above, according to the first invention, in the data signal transmission between LSIs mounted on the same wiring substrate or on different wiring substrates respectively, a characteristic difference between LSI chips, particularly a phase shift caused by dispersion of phase transition time, and a phase difference between reference clock signals distributed to each LSI can be eliminated. And thus, high speed data signals can correctly be transmitted. In addition, it is not necessary to additionally place a delay element on a wiring substrate and to perform a troublesome and time consuming phase adjustment.

Regarding ASIC, a user selects various basic cells from the basic cell library and combines them to arrange a circuit having various functions targeted. This circuit arrangement is supplied to an LSI maker to construct its LSI using ASIC. The phase difference absorbing means 44 can be arranged by selecting basic cell elements from the basic cell library and is not necessary to make a special specification LSI. Therefore, the phase difference absorbing means 44 can be constructed in low cost.

According to the second invention, The flip-flop of data signal send/receive part which is conventionally used in the interleave method is changed to a latch circuit. Since the latch circuit can be constructed by a basic cell, when the data signals are separated into N series and are transmitted, 2N basic elements can be saved. Thus, the saved basic elements in ASIC can be used for other functions.

According to the third invention, both of the meritorious advantages of the first invention and the second invention are provided.

What is claimed is:

1. A signal transmission apparatus provided with a plurality of LSIs comprising:

a clock source generating a reference clock signal;

at least a first LSI sending out data signals to be transmitted and a second LSI receiving the data signals;

distribution means for distributing said reference clock signal to said first and second LSIs wherein said first LSI, supplied with the distributed reference clock signal, and operating with an internal clock signal obtained from the distributed reference clock signal comprises a data output circuit outputting the data signals to outside thereof, and said second LSI, supplied with the distributed reference clock signals, and operating with an internal clock signal obtained from the distributed reference clock signal, comprises a data receiving circuit receiving said data signals from said first LSI;

a clock output circuit provided in said first LSI and outputting said internal clock signal of said first LSI at the same timing as that by which the data signals are outputted to the outside;

a clock receiving circuit provided in said second LSI and receiving said internal clock signal of the first LSI outputted from the clock output circuit, said data receiving circuit provided in said second LSI operatingly receiving the data signals from the data output circuit of the first LSI under control by the internal clock signal of the first LSI from said clock receiving circuit; and phase difference absorbing means provided in said second LSI for taking therein the received data signals from said data receiving circuit by the internal clock signal of the first LSI from said clock receiving circuit and for taking out said taken-in data signals by the internal clock signal of said second LSI.

2. A signal transmission apparatus provided with a plurality of LSIs comprising:

a clock source generating a reference clock signal;

distribution means for distributing said reference clock signal;

a first LSI, supplied with one of the distributed reference clock signals, operating with an internal clock signal obtained from the supplied reference clock signal, and outputting data signals from a data output circuit to outside thereof;

a second LSI, supplied with another one of the distributed reference clock signals, operating with an internal clock signal obtained from the supplied another reference clock signal, said second LSI having a data receiving circuit for receiving said data signals outputted from the first LSI;

a clock output circuit provided in said first LSI and outputting said internal clock signal of said first LSI at the same timing as that by which the data signals is outputted to the outside;

a clock receiving circuit provided in said second LSI and receiving said internal clock signal of the first LSI outputted from the clock output circuit to the outside; and phase difference absorbing means provided in said second LSI and taking therein the received data signals from said data receiving circuit by the internal clock signal of the first LSI from said clock receiving circuit and for taking out said taken-in data signals by the internal clock signal of said second LSI, wherein said phase difference absorbing means comprises:

take-in means for taking therein the received data signal from said data receiving circuit by the internal clock signal of said first LSI supplied from said clock receiving circuit and for converting the received data signal to N (N is an integer equal to or greater than 2) series of data signals each of which is sequentially shifted by a period of said clock signal of said first LSI from each other and has a prolonged length which is N time of the period of said clock signal of the first LSI, and take-out means for taking out from each of said N series of data signals a portion of each data signal corresponding to the period of the internal clock signal of said second LSI at a timing sequentially shifted by the period of the internal clock signal of said second LSI and assembling the data signal portions thus taken out into transmitted data signals.

3. The signal transmission apparatus according to claim 2 wherein said take-in means comprises:

means for converting the clock signal of said first LSI from said clock receiving circuit to N series of low speed clock signals each of which is sequentially shifted by the period of the clock signal of the first LSI and has a prolonged length of N time of the period of the clock signals of the first LSI, and N means each for taking therein the outputs of said data receiving circuit by said N series of low speed clock signals, respectively; and said take-out means comprises:

means for dividing frequency of the internal clock signal of said second LSI to one Nth frequency, and selector means for taking out a portion of data signals from the N means one after another at a timing sequentially shifted by the period of said internal clock signal of said second LSI using frequency divided outputs of the one Nth frequency from the frequency dividing means as selection signals for the selector means.

4. The signal transmission apparatus according to claim 2 wherein said data output circuit comprises:

means for creating from the internal clock signal of the first LSI, M (M is an integer equal to or greater than 2) series of low speed clock signals each of which is sequentially shifted from each other by a period of said internal clock signal of the first LSI and has a period which is M time the period of the internal clock signal, and M latch circuits latching the inputted data signals by said M series of low speed clock signals respectively and for outputting them as M series of low speed data signals; and said data receiving circuit comprises:

M data receiving parts receiving said outputted M series of low speed data signals, means for creating from the clock signal of the first LSI from said clock receiving circuit, M series of low speed clock signals each of which is sequentially shifted from each other by a period of the clock signal of the first LSI and has a period which is the period of the clock signal multiplied by M, M latch circuits latching output data signal from said M data receiving parts by these M series of low speed clock signals respectively, and a multiplexer sequentially taking out the outputs of these M latch circuits at every period of said received clock signal of the first LSI using the signals from the means for creating the low speed clock signals as control signals for the multiplexer.

5. The signal transmission apparatus according to claim 3 wherein said data output circuit comprises:

means for creating from the internal clock signal of the first LSI, M (M is an integer equal to or greater than 2) series of low speed clock signals each of which is sequentially shifted from each other by a period of said internal clock signal of the first LSI and has a period which is M time the period of the internal clock signal, and M latch circuits latching the inputted data signals by said M series of low speed clock signals respectively and for outputting them as M series of low speed data signals; and said data receiving circuit comprises:

M data receiving parts receiving said outputted M series of low speed data signals, means for creating from the clock signal of the first LSI from said clock receiving circuit, M series of low speed clock signals each of which is sequentially shifted from each other by a period of the clock signal of the first LSI and has a period which is the period of the clock signal multiplied by M, M latch circuits latching output data signal from said M data receiving parts by these M series of low speed clock signals respectively, and a multiplexer sequentially taking out the outputs of these M latch circuits at every period of said received clock signal of the first LSI using the signals from the means for creating the low speed clock signals as control signals for the multiplexer.

6. A signal transmission apparatus provided with a plurality of LSIs comprising:

a clock source generating a reference clock signal;

distribution means for distributing said reference clock signal;

a first LSI, supplied with one of the distributed reference clock signals, operating with an internal clock signal obtained from the supplied reference clock signal and outputting data signals from a data output circuit to outside thereof; and a second LSI, supplied with another one of the distributed reference clock signals, operating with an internal clock signal obtained from the supplied another reference clock signal, said second LSI having a data receiving circuit for receiving said data signals outputted from the first LSI;

a clock output circuit provided in said first LSI for outputting said internal clock signal of said first LSI at the same timing as that by which the data signals is outputted to the outside;

a clock receiving circuit provided in said second LSI for receiving said internal clock signal of the first LSI outputted from the clock output circuit to the outside; and phase difference absorbing means provided in said second LSI for taking therein the received data signals from said data receiving circuit by the internal clock signal of the first LSI from said clock receiving circuit and for taking out said taken-in data signals by the internal clock signal of said second LSI, wherein said phase difference absorbing means comprises means for writing the received data signals from said data receiving circuit in a memory in synchronization with the clock signal of the first LSI from said clock receiving circuit and means for taking out the storage contents of the memory in synchronization with the internal clock signal of said second LSI.

7. The signal transmission apparatus according to claim 6 wherein said memory is a FIFO memory.

8. The signal transmission apparatus according to claim 6 wherein said data output circuit comprises:

means for creating from the internal clock signal of the first LSI, M (M is an integer equal to or greater than 2) series of low speed clock signals each of which is sequentially shifted from each other by a period of said internal clock signal of the first LSI and has a period which is M time the period of the internal clock signal, and M latch circuits latching the inputted data signals by said M series of low speed clock signals respectively and for outputting them as M series of low speed data signals; and said data receiving circuit comprises:
M data receiving parts receiving said outputted M series of low speed data signals,
means for creating from the clock signal of the first LSI from said clock receiving circuit, M series of low speed clock signals each of which is sequentially shifted from each other by a period of the clock signal of the first LSI and has a period which is the period of the clock signal multiplied by M,
M latch circuits latching output data signal from said M data receiving parts by these M series of low speed clock signals respectively, and
a multiplexer sequentially taking out the outputs of these M latch circuits at every period of said received clock signal of the first LSI using the signals from the means for creating the low speed clock signals as control signals for the multiplexer.

9. The signal transmission apparatus according to claim 7 wherein said data output circuit comprises:

means for creating from the internal clock signal of the first LSI, M (M is an integer equal to or greater than 2) series of low speed clock signals each of which is sequentially shifted from each other by a period of said internal clock signal of the first LSI and has a period which is M time the period of the internal clock signal, and M latch circuits latching the inputted data signals by said M series of low speed clock signals respectively and for outputting them as M series of low speed data signals; and said data receiving circuit comprises:
M data receiving parts receiving said outputted M series of low speed data signals,
means for creating from the clock signal of the first LSI from said clock receiving circuit, M series of low speed clock signals each of which is sequentially shifted from each other by a period of the clock signal of the first LSI and has a period which is the period of the clock signal multiplied by M,
M latch circuits latching output data signal from said M data receiving parts by these M series of low speed clock signals respectively, and
a multiplexer sequentially taking out the outputs of these M latch circuits at every period of said received clock signal of the first LSI using the signals from the means for creating the low speed clock signals as control signals for the multiplexer.

10. A signal transmission apparatus provided with a plurality of LSIs comprising:

a clock source generating a reference clock signal;
at least a first LSI sending out data signals to be transmitted and a second LSI receiving the data signals;
distribution means for distributing said reference clock signal to said first and second LSIs, wherein said first LSI, supplied with the distributed reference clock signal, and operating with an internal clock signal obtained from the distributed reference clock signal comprises a data output circuit outputting the data signals to outside thereof, and said second LSI, supplied with the distributed reference clock signals, and operating with an internal clock signal obtained from the distributed reference clock signal, comprises a data receiving circuit receiving said data signals from said first LSI;

a clock output circuit provided in said first LSI and outputting said internal clock signal of said first LSI at the same timing as that by which the data signals are outputted to the outside;

a clock receiving circuit provided in said second LSI and receiving said internal clock signal of the first LSI outputted from the clock output circuit, said data receiving circuit provided in said second LSI operatingly receiving the data signals from the data output circuit of the first LSI under control by the internal clock signal of the first LSI from said clock receiving circuit; and phase difference absorbing means provided in said second LSI for taking therein the received data signals from said data receiving circuit by the internal clock signal of the first LSI from said clock receiving circuit and for taking out said taken-in data signals by the internal clock signal of said second LSI, wherein said data output circuit comprises:

means for creating from the internal clock signal of the first LSI, M (M is an integer equal to or greater than 2) series of low speed clock signals each of which is sequentially shifted from each other by a period of said internal clock signal of the first LSI and has a period which is M time the period of the internal clock signal, and M latch circuits latching the inputted data signals by said M series of low speed clock signals respectively and for outputting them as M series of low speed data signals; and said data receiving circuit comprises:
M data receiving parts receiving said outputted M series of low speed data signals,
means for creating from the clock signal of the first LSI from said clock receiving circuit, M series of low speed clock signals each of which is sequentially shifted from each other by a period of the clock signal of the first LSI and has a period which is the period of the clock signal multiplied by M,
M latch circuits latching output data signal from said M data receiving parts by these M series of low speed clock signals respectively, and
a multiplexer sequentially taking out the outputs of these M latch circuits at every period of said received clock signal of the first LSI using the signals from the means for creating the low speed clock signals as control signals for the multiplexer.

11. A signal transmission apparatus provided with a plurality of LSIs in which a reference clock signal from a clock source is supplied to a first LSI and a second LSI, said signal transmission apparatus comprising:
a data output circuit; and
a data input circuit, wherein said first LSI operates by said supplied reference clock signal to output data signals from the data output circuit to the outside, and said second LSI receives the data signals outputted to the outside by the data receiving circuit, said data output circuit comprising:
means for obtaining from said reference clock signal, M series of low speed clock signals each of which is sequentially shifted by a period of the reference clock signal and has a length of M time the period of the reference clock signal, and
M latch circuits for latching data signals synchronized with the timing of said reference clock signal by said M series of low speed clock signals respectively to output M series of the data signals from said first LSI to the outside,
said data receiving circuit comprising:
means for obtaining from said supplied reference clock signal, M series of low speed clock signals each of which is sequentially shifted by the period of the reference clock signal and has a length of M time the period of the reference clock signal,
M latch circuits for latching the M series of the data signals outputted from said first LSI by these M series of low speed clock signals respectively, and
a multiplexer sequentially taking out the outputs of these M latch circuits every period of said reference clock signal using the signals from the means for obtaining said low speed clock signals as control signals of the multiplexer.

* * * * *